United States Patent [19]

Hotte

[11] 3,793,567

[45] Feb. 19, 1974

[54] SAFETY INTERLOCK CIRCUIT
[75] Inventor: Gary D. Hotte, Harleysville, Pa.
[73] Assignee: Sperry Rand Corporation, New York, N.Y.
[22] Filed: July 25, 1972
[21] Appl. No.: 275,057

[52] U.S. Cl. .............................. 317/135, 317/136
[51] Int. Cl. ........................................ H01h 47/00
[58] Field of Search ............................ 317/136, 135

[56] References Cited
UNITED STATES PATENTS
3,056,905  10/1962  Rosenfeld et al. .................. 317/136

Primary Examiner—L. T. Hix
Attorney, Agent, or Firm—Griffin, Branigan and Butler

[57] ABSTRACT

A safety interlock circuit suitable for preventing the operation of a machine with an interlock is described. The safety interlock circuit comprises an interlock switch connected to a start/stop manual/relay operated switch. When the interlock switch is in a non-interlock state, closure of the start/stop manual/relay switch allows the machine to operate normally. When the interlock switch is in an interlock state, the machine cannot be energized. Moreover, closure of the start/stop manual/relay switch when the interlock switch is in an interlock state merely energizes the relay portion of the start/stop manual/relay switch causing it to reopen.

4 Claims, 1 Drawing Figure

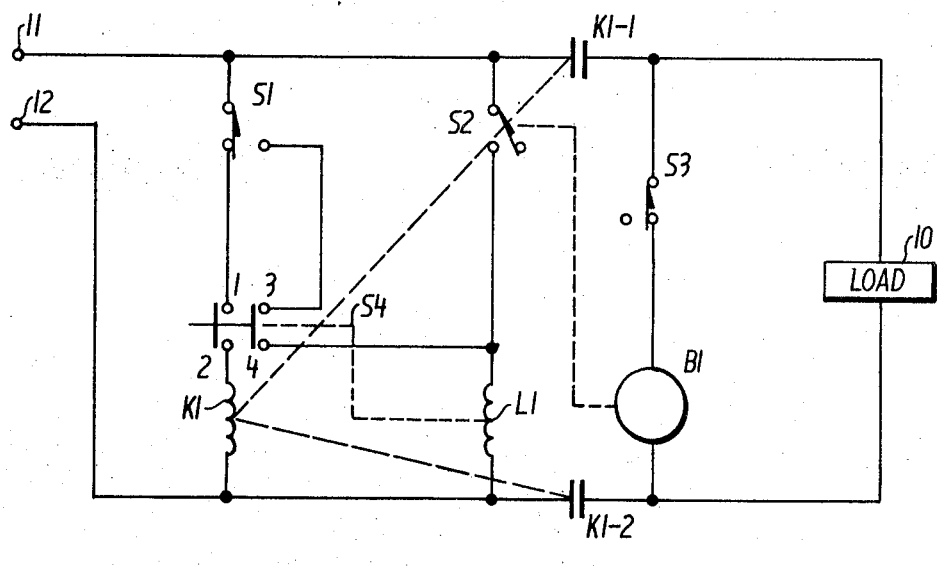

3,793,567

SAFETY INTERLOCK CIRCUIT

BACKGROUND OF THE INVENTION

This invention relates to safety circuits and more particularly to safety circuits suitable for preventing the operation of a machine with an interlock.

A wide variety of machines utilize interlocks to interrupt the operation of a machine when certain predetermined conditions occur. One particular type of machine, where interlocks are used, are photocopiers. For example, the operation of a photocopier is interrupted when an interlock switch is closed to indicate that the machine has exhausted its supply of copy paper. This "interruption" informs the operator that he must put new copy paper into the machine before he will receive the desired copies.

One problem with prior art interlock circuits is that they do not prevent further operation of the machine after an interlock has occurred. That is, even though an interlock has occurred and the operation of the machine has been interrupted, the operator of the machine can still press the start/stop button and cause the machine to go through at least one more cycle of operation before the interlock again interrupts the operation of the machine. Consequently, it is desirable to provide a interlock circuit which prevents the operator from re-energizing the machine after an interlock has occurred.

Therefore, it is an object of this invention to provide a safety interlock circuit.

It is a further object of this invention to provide a new and improved interlock circuit which prevents the operation of a machine until an interlock condition has been corrected.

It is yet another object of this invention to provide a safety interlock circuit suitable for use in a photocopier machine to prevent the operator from operating the photocopier when the photocopier is in an interlock state.

SUMMARY OF THE INVENTION

In accordance with principles of this invention a safety interlock circuit suitable for preventing the operation of a machine with an interlock is disclosed. The circuit comprises an interlock switch connected to either allow power to flow through a start/stop manual/relay operated switch or prevent the flow of power therethrough. When the interlock switch is in a non-interlock state, closure of the start/stop manual/relay switch allows the machine to operate normally. When the interlock switch is in an interlock state, the machine is prevented from operating. Moreover, closure of the start/stop manual/relay switch when the interlock switch is in an interlock state merely energizes the relay portion of the start/stop manual/relay switch causing it to reopen.

In accordance with further principles of this invention, the interlock switch is a single pole-double throw switch. In addition, the start/stop manual/relay switch is a double pole-single throw switch. Each set of poles of the start/stop manual/relay switch is connected in series with one of the throws of the interlock switch. One of said series combinations is connected in series with a relay coil that closes contacts which allow energy to flow to the machine. The other series combination is connected in series with the relay coil of the start/stop manual/relay switch. Thus, when the interlock is in one position, the relay coil which allows energy to flow to the machine when the start/stop manual/relay switch is closed is energized. When the interlock switch is in the other position, the relay coil of the start/stop manual/relay switch is energized when the start/stop manual/relay switch is closed.

It will be appreciated from the foregoing brief summary of the invention that a safety interlock circuit suitable for use in preventing the operation of a machine in an interlock state is provided by the invention. More specifically, when the interlock switch of the safety interlock circuit is in a non-interlock condition, the machine is energized in the normal manner when a start/stop manual/relay switch is closed. Alternatively, when the interlock switch indicates the machine is in an interlock state, closure of the start/stop manual/relay switch does not energize the machine. Rather, closure of this switch merely energizes its relay portion and causes it to immediately reopen.

BRIEF DESCRIPTION OF THE DRAWINGS

The foregoing objects and many of the invention advantages of this invention will become more readily appreciated as the same becomes better understood by reference to the following detailed description when taken in conjunction with the accompanying drawing wherein a preferred embodiment of the safety interlock circuit of the invention is illustrated.

DESCRIPTION OF THE PREFERRED EMBODIMENT

The drawing illustrates a preferred embodiment of the invention and comprises: a single pole-double throw interlock switch designated S1; two single pole-single throw switches designated S2 and S3; a start/stop manual/relay switch designated S4; a relay having a coil designated K1-1 and K1-2; a motor designated B1; and, a load 10. For purposes of this description, the single pole-double throw switch S1 includes a common terminal and right and left contact terminals illustrated as such in the drawing. The start/stop manual/relay switch S4 includes a operating coil designated L1 and four contacts 1, 2, 3 and 4. When S4 is closed contacts 1 and 2 are connected together, as are contacts 3 and 4. When energized L1 open all of these contacts. They are closed by the manual operation of a push button. Reference is hereby made to U.S. Pat. application Ser. No. 274,748 filed by Gary D. Hotte and Gordon L. Milligan on July 24, 1972 and entitled Electromechanical Switch for a more detailed description of a switch suitable for use as S4. Also illustrated in the drawing are first and second input terminals 11 and 12 which are adapted to receive power from a suitable power source (not shown).

The first input terminal 11 is connected to the common terminal of S1, one terminal of S2 and one side of K1-1. The other side of K1-1 is connected to one terminal of S3 and one side of the load 10. The second input terminal 12 is connected to one side of K1, one side of L1 and one side of K1-2. The other side of the K1-2 is connected to one side of the motor B1 and to the other side of the load 10.

The left terminal of S1 is connected to contact 1 of S4 and the right terminal of S1 is connected to contact 3 of S4. Contact 2 of S4 is connected to the other side of K1 and contact 4 of S4 is connected to the other side of L1. The other side of L1 is also connected to the other terminal of S2. The other terminal of S3 is connected to the other side of the motor B1.

The shaft of B1 operates a cam, illustrated schematically by a dashed line in the Figure, adapted to open and close S2 in accordance with the position of the cam's lobe, as the shaft of B1 revolves.

The Figure illustrates the circuit in its normal or non-interlock state, i.e., the common terminal of S1 is connected to its left terminal via the switch element. Under these conditions, the load is ready for energization and, thus, the machine is in a runable state. Hence, when S4, which is preferably a manually operated push button switch, is closed, energy flows through S1 and terminals 1 and 2 of S4 to energize K1. When this occurs, K1-1 and K1-2 close. Thus, power is supplied to the load 10 and through S3 to B1. Energization of B1 causes its shaft to rotate. When the lobe of the shaft impinges on the movement of S2, S2 closes. When S2 closes L1 becomes energized. Energization of L1 causes 4 to open. The timing of the cam is such that S2 opens as S4 opens. This is a normal cycle of operation.

Turning now to the interlock mode of operation, when this condition occurs, S1 is shifted to its rightmost rather than its leftmost closure position, as illustrated in the Figure. When S1 is in this position and S4 is closed, no current flows through K1. Since K1 is unergized, K1-1 and K1-2 do not close. Thus, power cannot be applied to either the load 10 or the motor B1. However, current does flow through contacts 3 and 4 of S4 to L1. But, energization of L1 merely causes S4 to reopen. Thus, the machine (load) cannot be operated until the condition causing S1 to shift to the right is corrected.

It will be appreciated from the foregoing description of the invention that a protective circuit suitable for use in a machine having interlock switches is provided by the invention. That is, the invention provides a protective circuit that prevents an operator from merely closing an on/off switch to cause energization of the machine when an interlock interrupt has occurred. Rather, the operator must correct for the interlock before he can operate the machine. For example, if the interlock switch (S1) is operated by the amount of copy paper in a photocopier, when a suitable amount of paper is in the machine, S1 will be in the leftmost position and the machine would operate when S4 is closed. However, when the supply of copy paper becomes exhausted or reaches an unsatisfactory low level, S1 will switch to its rightmost position. When this occurs, the photocopier will remain inoperable in the manner described above.

While a preferred embodiment of the invention has been illustrated and described, it will be appreciated by those skilled in the art and other that various changes can be made therein without departing from the spirit and scope of the invention. For example, if the machine has a plurality of interlocks, a plurality of switches similar to S1 can be utilized. In this case, one set of terminals of each S1 would be connected in series with terminals 1 and 2 of S4 and the relay coil K. The other set of terminals of each S1 would be connected in parallel so as to apply power through terminals 3 and 4 of S4 should any one of these interlock switches be in an interrupted (rightmost) position. Hence, the invention can be practiced otherwise than as specifically described herein.

The embodiment of the invention in which an exclusive property or privilege is claimed are defined as follows:

1. A safety interlock circuit for preventing the operation of a machine with an interlock comprising:
   an interlock switch adapted to change position from a non-interlock position to an interlock position when an interlock occurs in the machine incorporating said interlock switch;
   a manual/relay start/stop switch including:
   a relay coil connected so as to be in series with said interlock switch when said interlock switch is in its interlock position so as to allow current to flow through said relay coil when said interlock switch is in said interlock position; and,
   a first set of contacts adapted to be manually closed, and opened by current flowing through said relay coil, said first set of contacts connected so as to be in series with said interlock switch when said interlock switch is in its non-interlock position; and,
   control means for controlling the operation of said machine, said control means being power energizable and connected in series with said first set of contacts of said manual/relay start/stop switch and said interlock switch when said interlock switch is in its non-interlock position, said control means adapted to allow power to flow to said machine when it is energized and prevent power from flowing to said machine when it is unenergized.

2. A safety interlock circuit as claimed in claim 1 wherein said manual/relay start/stop switch includes a second set of contacts adapted to be manually closed, and opened by energization of said relay coil, said second set of contacts being connected in series with said relay coil and said interlock switch when said interlock switch is in its interlock position.

3. A safety interlock circuit as claimed in claim 2 wherein said control means comprises a power relay having a coil connected in series with said first set of contacts and said interlock switch wnen said interlock switch is in its non-interlock position, and power contacts connected between said machine and its source of power, said power contacts being closed when said coil has current flowing through it.

4. A safety interlock circuit as claimed in claim 3 including a cam operated switch connected in series with the relay coil of said manual/relay start/stop switch so as to allow power to flow to said relay coil when said cam is in a predetermined position, said cam operated switch being rotated by a motor, said motor being energized when the contacts of said power relay are closed.

* * * * *